3,577,372
HOT MELT ADHESIVE COMPOSITIONS
Thomas P. Flanagan, Green Brook, and Irving I. Kaye, Murray Hill, N.J., assignors to National Starch and Chemical Corporation, New York, N.Y.
No Drawing. Filed July 30, 1968, Ser. No. 748,607
Int. Cl. C08f 45/52; C09j 3/14, 7/00
U.S. Cl. 260—23
6 Claims

ABSTRACT OF THE DISCLOSURE

Hot melt adhesive compositions comprising a blend of an atactic polypropylene resin and an aliphatic petroleum hydrocarbon tackifying resin. The resulting hot melts are utilizable in a variety of packaging, laminating and specialty hot melt applications.

A class of adhesive compositions known as hot melt adhesives have enjoyed continually increasing usage in industrial applications. These hot melt adhesives are solid or semi-solid combinations of film forming resins, tackifying resins, rubbery polymers, plasticizers, waxes and similar materials which may be added to the composition in order to impart various properties thereto. Adhesive bonds derived from hot melts are particularly useful because of their tackiness in the molten state and their ultimate highly flexible nature. In addition hot melts yield bonds that display resistance to embrittlement under conditions of extreme cold, thereby making them ideal for adhesive applications requiring exposure to low temperatures such, for example, as frozen food packaging.

It is an object of this invention to provide hot melt adhesive compositions which possess outstanding characteristics of flexibility, tackiness, stability and adhesive strength. A further object of this invention is to provide adhesive compositions which are characterized by their ability to adhere to a wide variety of substrates. Still another object is to provide an adhesive which may be handled in bulk form for use in the presently available premelting equipment; or, which may be pelletized, diced, or granulated for convenient premelting in an applicator of the extruder type; or, which may be utilized in rope or cord form for applicators designed to handle adhesives in the latter physical forms. Various other objects and advantages of this invention will be apparent to the practitioner from the following description thereof.

As previously noted, the novel hot melt adhesive compositions of this invention comprise a blend of: (1) an atactic polypropylene resin which represents the basic component of the system; and, (2) an aliphatic petroleum hydrocarbon resin which functions as a tackifying resin and thereby extends the adhesive properties of the system.

The polypropylene which is the basic component of the adhesives of this invention is formed during the stereospecific polymerization of propylene and is referred to as an "atactic" polymer in that the repeating units of its polymeric chain vary in a random configuration along the chain. This is to be contrasted with "isotactic" or "stereospecific" polymers wherein the repeating units of the polymeric chain all possess the same stereochemical configuration along the chain. The stereochemical nature of the atactic polypropylene required for use in our novel adhesives may be readily observed from the following structural depiction thereof.

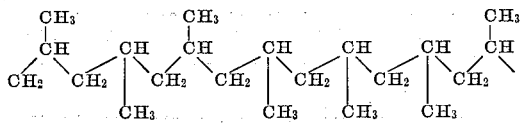

In manufacturing polypropylene, the processes currently employed make use of stereospecific catalysts, i.e. catalysts comprising a coordination complex of a transition metal halide with an organometallic compound, which are chosen for their ability to provide the resulting polypropylene with an isotactic structure. Despite the presence of such catalysts, the resulting polymerization product still contains from about 5 to 15%, by weight, of atactic polypropylene. This atactic portion may be separated from the crystalline material by means of a solvent extraction technique utilizing, for example, a heptane solvent; the latter solvent then being distilled off in order to produce the solid atactic polypropylene.

In view of the nature of the above described recovery procedure, it is highly likely that the resulting atactic polypropylene will be contaminated with minor amounts of isotactic polypropylene and/or solvent. It should be noted, however, that minor amounts of such contaminants can be tolerated in the atactic polypropylene which is applicable for use in the novel hot melts of this invention. Furthermore, the temperature at which the hot melt is eventually formulated will usually be sufficiently high in order to evaporate any residual solvent which may be present in the atactic polypropylene.

With regard to the physical properties of the applicable atactic polypropylene resins, it will typically exhibit a Ball and Ring softening point, as determined by ASTM method E 28–58T, of from about 95 to 160° C.; a molten viscosity of from about 1000 to 15,000 centipoises at 350° F., as determined by a Brookfield Viscometer using a #6 spindle at 20 r.p.m.; and a specific gravity of from about 0.79 to 0.87.

The aliphatic petroleum hydrocarbon tackifying resins which are present in the novel hot melts of this invention serve to extend the adhesive properties of the atactic polypropylene. Such tackifying resins are typically prepared during the polymerization of monomers consisting primarily of olefins and diolefins and include, for example, the residual by-product monomers resulting from the manufacture of isoprene. These tackifying resins typically exhibit a ball and ring softening point of from about 80 to 125° C.; an acid number of from about 0 to 2; a saponification value of less than about 1; and, an iodine value of from about 75–100. Examples of commercially available resins of this type are Wing-Tack 95 as sold by the Goodyear Tire and Rubber Co. and the Sta-Tac and Betaprene H resins sold by the Reichhold Chemical Corp.

The procedure for preparing these novel hot melt adhesive compositions involves placing the aliphatic petroleum hydrocarbon tackifying resin in a jacketed mixing kettle (or in a jacketed heavy duty mixer of the Baker-Perkins or Day type for compositions having high viscosities, equipped with rotors and thereupon raising the temperature to a range of from about 250 to 400° F.; the precise temperature utilized depending upon the melting points of the tackifying resin and the atactic polypropylene. When the resin has melted, stirring is initiated and the atactic polypropylene is then added over a prolonged period in order to avoid the formation of lumps. Stirring and heating are continued until a smooth, homogeneous mass is obtained whereupon any optional additive whose presence may be desired is thoroughly admixed therewith. The resulting hot melt adhesive composition is drawn off and may be used immediately in hot pots; or, it may be molten-extruded into rope form or converted into pellets, rods, cylinders, slugs or billets depending upon the equipment which will be subsequently used to apply the hot melt; or, it may be placed in cooling pans and held in bulk form for later use; or, it may be granulated or diced.

With respect to proportions, the atactic polypropylene should be present in the novel hot melt adhesive compositions of this invention in a minimum concentration of about 40%, by weight. Furthermore, in order to achieve superior hot melt properties, the weight ratio of atactic polypropylene to tackifier resin should range from about 1.8:1 to 9:1. The use of such weight ratios which fall about 1.8:1 is undesirable in view of the brittle properties which are exhibited by the adhesive films derived from such hot melts when the latter films are exposed to low temperatures. In contrast, the use of atactic polypropylene:tackifier weight ratios which exceed about 9:1 is also undesirable in view of the excessive waxy nature of the resulting hot melt and the inferior tackiness which is directly attributable thereto. Furthermore, the presence of such low concentration levels of the tackifier has an adverse effect on the elevated temperature aging properties of the resulting hot melt compositions.

As a desirable optional ingredient, wax diluents may be employed in our novel systems in order to reduce the melt viscosity or cohesive characteristics of the hot melt adhesive composition without appreciably decreasing its adhesive binding characteristics. Among the applicable wax diluents are included: liquid polypropylene having a low molecular weight in the range of from about 700 to 1200; petroleum waxes such, for example, as paraffin and microcrystalline waxes; polyethylene greases; hydrogenated animal, fish and vegetable fats; mineral oil; and, synthetic waxes such, for example, as Fischer-Tropsch wax.

Other optional additives may be incorporated into the hot melt compositions of this invention in order to modify certain properties thereof. Among these additives may be included: stabilizers and antioxidants such, for example, as butylated hydroxytoluene, high molecular weight hindered phenols, and substituted phosphites; colorants such as titanium dioxide and watchung red; and, filler such as clay and talc, etc. It should also be noted that minor quantities of isotactic polypropylene may be added in order to alter the flexibility characteristics of the adhesive films cast from our novel hot melt compositions.

The hot melt adhesives of this invention display several outstanding features. Of primary importance is the fact that the adhesive bonds derived from these hot melts are characterized by remarkable tackiness in the molten state and flexibility upon solidification. The hot melts are also characterized by their broad adhesion properties, low cost, minimal odor and light color. In addition, they are extremely resistant to oxidative or thermal degradation and embrittlement at low temperatures. Moreover, these adhesives are highly stable as a result of the excellent compatibility displayed by the various components of said adhesives. Furthermore, they are characterized by their ability to be readily coated onto and used for the lamination of various types of substrates including, for example, metallic foils, paper, coated paper, and polyethylene and polypropylene films.

As previously indicated, the novel hot melts of this invention may be effectively utilized in a variety of packaging, laminating, carton sealing and book binding operations. Thus, for example, in a case sealing operation, a series of lines of molten hot melt is applied to the case flaps at a temperature of 325–350° F. The flaps are then closed and held under compression for a period of one to three seconds in order that the hot melt can solidify sufficiently so as to enable it to withstand the natural tendency of the flaps to spring open. In a paper-to-paper laminating operation, such as that encountered in the preparation of glass fiber reinforced gummed tape, the hot melt is typically melted in a pre-melt tank and then pumped to an applicator roll where it is coated, at a temperature of 325–360° F., onto a web of paper in a coating weight of from about 20 to 40 pounds per 3000 square feet of web. Thereafter, a roving of glass fibers is inserted between the coated web and a second or top web which is applied thereto. The combined web is then gummed, in the event the webs have not been pregummed, dried, slit and finally packaged.

The following examples will further illustrate the embodiment of this invention. In these examples, all parts given are by weight unless otherwise noted.

EXAMPLE I

This example illustrates the preparation of a hot melt adhesive composition typical of the novel products of this invention.

A kettle which had been heated to 300° F. and was equipped with a stirring paddle was charged with 25 parts of an aliphatic petroleum hydrocarbon resin having a ball and ring softening point of 95° C., an acid number of less than 1.0 and an iodine number of approximately 100; the latter resin being commercially available under the trademark "Wing-Tack 95" sold by the Goodyear Tire and Rubber Co. This resin was completely melted. Stirring was then initiated and 75 parts of atactic polypropylene having a ball and ring softening point of 155° C. and a melt viscosity of 3450 centipoises at 350° F. were added slowly in order to prevent the formation of lumps. Heating and stirring were continued until a clear, homogeneous mass was obtained whereupon 0.5 part of butylated hydroxytoluene were admixed therewith.

The resulting homogeneous hot melt composition had a melt viscosity of 2000 centipoises at 350° F., as determined by a Brookfield viscometer using a #6 spindle at 20 r.p.m. Upon coating the above prepared molten hot melt composition onto a variety of paper stocks, excellent tack and adhesive qualities were noted in each instance.

Furthermore, a two ply laminate of kraft stock was then prepared by applying a 2 mil film of the molten hot melt to a surface of one of the plies and then placing the second ply of kraft in face-to-face contact with the adhesive coated sheet. Upon solidification of the hot melt, the resulting laminate was physically delaminated and then examined for the purpose of determining the degree of fiber tear which was evident on each of the kraft sheets. In this instance, extensive fiber tear was observed thereby indicating the excellent adhesive properties of the bonds derived from the above described hot melt composition.

EXAMPLE II

This example illustrates the preparation of a number of additional hot melt compositions of this invention.

The general procedure set forth in Example I, hereinabove, was utilized in preparing each of the following hot melt compositions. The characteristics of the resulting hot melts were then determined by submitting the compositions to one or more of the following test procedures:

Melt viscosity—determined on a Brookfield viscometer using a #6 spindle at 20 r.p.m.

Moisture vapor transmission rate (MVTR)—This property was determined by means of ASTM method E 96–53T and served to indicate the efficiency of the hot melt coating as a barrier to moisture vapor.

Setting speed—A three mil thick film of the molten hot melt was applied to a sheet of kraft stock. The time required for total solidification of the adhesive film was then noted as the "setting speed" thereof.

Composition A

|  | Parts |
|---|---|
| Atactic polypropylene—ball and ring softening point of 100° C. and a melt viscosity of 4200 cps. at 350° F. | 75 |
| Aliphatic petroleum hydrocarbon resin (as described in Example I) | 25 |
| Butylated hydroxytoluene—melt viscosity, 3000 centipoises at 350° F.; setting speed, 20 seconds | 0.5 |

Composition B

| | Parts |
|---|---|
| Atactic polypropylene—ball and ring softening point of 135° C. and a melt viscosity of 4500 cps. at 350° F. | 70 |
| Aliphatic petroleum hydrocarbon resin (as described in Example I) | 30 |
| Butylated hydroxytoluene — melt viscosity, 5500 centipoises at 300° F.; MVTR value, 1.42 grams/100 square inches/24 hours; density, 0.91 grams/cubic centimeter; setting speed, 14 seconds | 0.5 |

Composition C

Composition B was modified by adding 10 parts of paraffin wax having a melting point of 150° F. to the formulation. The resulting hot melt exhibited a melt viscosity of 2250 centipoises at 350° F.; a MVTR value of 0.45 gram/100 square inches/24 hours; and, a setting speed of 10 seconds.

Composition D

Composition C was modified by adding 20 parts of talc to the formulation. The resulting hot melt exhibited a melt viscosity of 3750 centipoises at 300° F. and a density of 1.01 grams/cubic centimeter.

Composition E

| | Parts |
|---|---|
| Atactic polypropylene—ball and ring softening point of 140° C. and a melt viscosity of 6000 centipoises at 350° F. | 60 |
| Aliphatic petroleum hydrocarbon resin (as described in Example I) | 30 |
| Liquid polypropylene having a molecular weight of 800 | 10 |
| n-Octadecyl 3(3,5-di-tert-butyl-4-hydroxyphenyl)propionate melt viscosity, 2000 centipoises at 300° F.; setting speed, 20 seconds | 0.1 |

Composition F [1]

| | Parts |
|---|---|
| Atactic polypropylene—ball and ring softening point of 135° C. and a melt viscosity of 2000 cps. at 350° F. | 70 |
| Isotactic polypropylene having a melt flow of 40 | 5 |
| Aliphatic petroleum hydrocarbon resin (as described in Example I) | 25 |
| n-Octadecyl 3(3,5-di-tert-butyl-4-hydroxyphenyl)propionate—melt viscosity, 3000 centipoises at 350° F.; ball and ring softening point, 157° C. | 0.1 |

[1] Hot melt was prepared at a temperature of 375–400° F.

Composition G

| | Parts |
|---|---|
| Atactic polypropylene—ball and ring softening point of 145° C. and a melt viscosity of 4375 cps. at 350° F. | 75 |
| Aliphatic petroleum hydrocarbon resin—ball and ring softening point of 100° C.; an acid number of less than 1; an iodine number of 98; and, a saponification value of less than 1; (commercially available under the trademark "Betaprene H–100" as sold by the Reichold Chemical Corp.) | 25 |
| Butylated hydroxytoluene—melt viscosity, 3375 centipoises at 350° F.; excellent adhesive properties at temperatures ranging from about 0 to 160° F. | 0.5 |

EXAMPLE III

This example illustrates the advisability of having the tackifying resin present in the hot melt composition within the concentration range specified herein.

The general procedure set forth in Example I, hereinabove, was utilized in preparing each of the following hot melt compositions.

| | Parts | | | |
|---|---|---|---|---|
| Composition Number | 1 | 2 | 3 | 4 |
| Atactic polypropylene—ball and ring softening point [1] | 100 | 90 | 65 | 60 |
| Aliphatic petroleum hydrocarbon resin (as described in Example I) | | 10 | 35 | 40 |
| Butylated hydroxytoluene | 0.5 | 0.5 | 0.5 | 0.5 |
| Melt viscosity of hot melt (cps. at 350° F.) | 3,450 | 2,900 | 1,500 | 1,200 |

[1] 150° C. and a melt viscosity of 3,450 centipoises at 350° F.

The resulting hot melt compositions were then subjected to the "Fiber Tear" test set forth in Example I, hereinabove. In this instance, laminates prepared with each of the hot melts were conditioned, for periods of 48 hours, at 35° F., 72° F., and 110° F., respectively, prior to being delaminated at each of these temperatures. The results obtained are presented in the following table.

| Composition Number | Amount of fiber tear | | |
|---|---|---|---|
| | 35° F. | 72° F. | 110° F. |
| 1 | None | Extensive | None. |
| 2 | Extensive | do | Extensive. |
| 3 | do | do | Do. |
| 4 | None [1] | do | |

[1] Exceedingly brittle adhesive bond.

The results summarized above clearly indicate the advisability of maintaining the relative concentrations of atactic polypropylene and tackifier in our novel hot melt compositions within the specified weight ratios of from about 1.8:1 to 9:1.

Summarizing, it is thus seen that this invention provides for the preparation of a novel class of hot melt adhesive compositions which exhibit a broad range of adhesive properties.

Variations may be made in proportions, procedures and materials without departing from the scope of this invention which is defined by the following claims.

We claim:

1. A hot melt adhesive composition consisting essentially of a blend of an atactic polypropylene resin and an aliphatic petroleum hydrocarbon tackifying resin, wherein the weight ratio of said atactic polypropylene resin to said aliphatic petroleum hydrocarbon tackifier is in the range of from about 1.8:1 to 9:1.

2. The hot melt composition of claim 1, wherein said atactic polypropylene resin has a ball and ring softening point of from about 95 to 160° C. and a melt viscosity of from about 1000 to 15,000 centipoises at 350° F.

3. The hot melt composition of claim 1, wherein said aliphatic petroleum hydrocarbon tackifying resin has a ball and ring softening point of from about 80 to 125° C.; an acid number of from about 0 to 2; a saponification value of less than about 1; and, an iodine value of from about 75 to 100.

4. The hot melt composition of claim 1 in which there is also admixed a wax diluent.

5. The hot melt composition of claim 4, wherein said wax diluent is selected from the group consisting of liquid polypropylene having a molecular weight of from about 700 to 1200, paraffin wax, microcrystalline wax, polyethylene greases, hydrogenated animal fats, hydrogenated vegetable fats, hydrogenated fish fats, mineral oil and Fischer-Tropsch wax.

6. The hot melt composition of claim 1 in which there is also dispersed a stabilizer against thermal and oxidative degradation.

(References on following page)

References Cited

UNITED STATES PATENTS

| | | | |
|---|---|---|---|
| 3,132,027 | 5/1964 | Norton et al. | 260—28.5 |
| 3,144,423 | 8/1964 | Belak et al. | 260—28.5 |
| 3,220,966 | 11/1965 | Flanagan | 260—27 |
| 3,247,142 | 4/1966 | Brunson et al. | 260—23 |
| 3,356,766 | 12/1967 | Ware | 260—897 |
| 3,360,488 | 12/1967 | Hall et al. | 260—23 |
| 3,448,178 | 6/1969 | Flanagan | 260—897 |
| 3,325,562 | 6/1967 | Peterkin | 260—897 |
| 3,341,626 | 9/1967 | Peterkin | 260—897 |
| 3,402,140 | 9/1968 | Bickel et al. | 260—38 |
| 3,492,372 | 1/1970 | Flanagan | 260—897 |

DONALD E. CZAJA, Primary Examiner

R. W. GRIFFIN, Assistant Examiner

U.S. Cl. X.R.

117—122, 126, 155, 161; 260—28.5, 33.6, 41, 45.7, 45.95, 897